United States Patent [19]

Yokoe et al.

[11] Patent Number: 4,713,090

[45] Date of Patent: Dec. 15, 1987

[54] ADSORBENT FOR SEPARATION-RECOVERY OF CO, PREPARING METHOD THEREOF AND PROCESS FOR SEPARATION-RECOVERY OF HIGH PURITY CO, USING THE ADSORBENT

[75] Inventors: Jintaro Yokoe; Masami Takeuchi; Toshiaki Tsuji, all of Amagasaki, Japan

[73] Assignee: Kansai Netsukagaku Kabushiki Kaisha, Hyogo, Japan

[21] Appl. No.: 907,915

[22] Filed: Sep. 16, 1986

[30] Foreign Application Priority Data

Sep. 17, 1985 [JP] Japan .................................. 60-205972

[51] Int. Cl.$^4$ .............................................. B01D 53/04
[52] U.S. Cl. .......................................... 55/68; 55/74; 423/247; 502/402; 502/413; 502/415
[58] Field of Search ................... 55/68, 74; 423/247; 502/159, 401, 402, 404, 413, 415

[56] References Cited

U.S. PATENT DOCUMENTS

| 3,501,897 | 3/1970 | Helden et al. | 55/74 X |
|---|---|---|---|
| 3,726,811 | 4/1973 | Toombs et al. | 502/415 |
| 3,812,652 | 5/1974 | Carr et al. | 55/74 X |
| 3,812,653 | 5/1974 | Massoth et al. | 55/74 X |
| 3,951,859 | 4/1976 | Inaba et al. | 502/404 X |
| 4,019,879 | 4/1977 | Rabo et al. | 55/68 |
| 4,242,226 | 12/1980 | Siren | 55/74 X |
| 4,259,213 | 3/1981 | Bishop, III | 502/415 |
| 4,264,342 | 4/1981 | Arnold et al. | 502/402 X |
| 4,470,829 | 9/1984 | Hirai et al. | 55/68 |
| 4,587,114 | 5/1986 | Hirai et al. | 423/247 |

FOREIGN PATENT DOCUMENTS

| 90036 | 5/1985 | Japan | 502/415 |
|---|---|---|---|
| 90037 | 5/1985 | Japan | 502/415 |

*Primary Examiner*—Robert Spitzer
*Attorney, Agent, or Firm*—Armstrong, Nikaido, Marmelstein & Kubovcik

[57] ABSTRACT

An adsorbent for separation - recovery of CO comprising a composite carrier (X) composed of a carrier (a) formed of silica and/or alumina and an active carbonized material layer (b) formed thereon, on which a copper compound (Y) is carried.

By applying the method of the pressure swing adsorption and/or temperature swing adsorption, using this adsorbent, high purity CO may be separated and recovered on industrial scale from converter gas and other gases containing CO.

20 Claims, 2 Drawing Figures

FIG. 2

ADSORBENT FOR SEPARATION-RECOVERY OF CO, PREPARING METHOD THEREOF AND PROCESS FOR SEPARATION-RECOVERY OF HIGH PURITY CO, USING THE ADSORBENT

BACKGROUND OF THE INVENTION

1. Field of Industrial Application

This invention relates to an adsorbent used for the purpose of separation—recovery of high purity CO from any mixed gas containing CO by the method of pressure swing adsorption (hereinafter referred to as PSA) and/or temperature swing adsorption (hereinafter referred to as TSA) and further, pertains to a method of preparing this adsorbent and the process for separation—recovery of high purity CO, using this adsorbent.

2. Prior Art

Representatives of gases with CO as their main component include converter gas obtained from converters in ironworks, blast furnace gas obtained from blast furnaces, electric furnace gas obtained from electric furnaces and producer gas obtained by gasifying coke. Most of these gases use for fuel. They contain around 70% by volume or more of CO, if the CO contained in these gases can be separated or recovered at high purities, it may be utilized as material for synthesizing formic acid, acetic acid, etc., or for reduction of organic compounds, etc., to be of great benefit to chemical industries.

Heretofore, as a process for separation—recovery of CO from gases with CO as their main component, there have been known low-temperature processing, cuprous ammonium processes, COSORB process, etc. These processes involve such problems as high cost for equipment and high expenses required for electric power, steam and the like heat energies, so that although they are suitable for separation—recovery of large volumes of CO, they are not necessarily adaptable for separation—recovery of medium or small volumes of CO. Moreover, because of the inclusion of the CO obtained through separation by these methods of such gases as $O_2$, $CO_2$, etc., which are deleterious to reactions of organic syntheses, it can not be put to use for organic syntheses.

As methods for making selective separation of specified gases from medium or small volumes of material gases, PSA and TSA methods are known.

The PSA method is one of methods for selective separation of the specified gas from any mixed gas, which effects separation of adsorbate from nonadsorbate by getting the object gas adsorbed on some adsorbent under a high pressure and then, removing the adsorbed object therefrom under a reduced pressure. In industrial applications, a plurality of towers filled with adsorbent are installed; in each adsorption tower, a series of operations of pressure-up—adsorption—cleaning—degassing are repeated, whereby the separation—recovery is continuously performed in the system as a whole.

The TSA method, like the aforementioned PSA method, is one of the methods of making selective separation of the specified gas from any mixed gas; the object gas is adsorbed on the adsorbent and then, by raising the temperature of the adsorption system, the adsorbate on the adsorbent is removed, thereby separating an adsorbate from nonadsorbates.

Heretofore, as a process for separation—recovery of CO from any mixed gas containing CO by this PSA method, a method utilizing mordenitic zeolite as the adsorbent has been proposed. (Refer to Japanese Patent Un-Examined Publication No. 22625/1984; ibid. No. 49818/1984.)

As a process for separation—recovery of CO from any mixed gas containing CO by the PSA or TSA method, use of such copper compounds as cuprous halides, cuprous oxide, cupric salts, cupric oxide, etc., carried on active carbon as the adsorbents has been proposed. (Refer to Japanese Patent Un-Examined Publication Nos. 156517/1983, 69414/1984, 105841/1984 and 136134/1984.)

As a preparing method of CO adsorbent—remover for use in separation—recovery of CO from any mixed gas containing CO by the PSA or TSA method, there has been proposed a process which comprises contacting an organic solvent solution of cuprous halides and aluminum halides with such a porous inorganic oxide(s) as alumina, silica or silica/alumina, etc., and then, removing free organic solvent. (Refer to Japanese Patent Un-Examined Publication Nos. 90036/1985 and 90037/1985.)

The applicant of the present invention has already filed an Japanese patent application for a method which comprises using an adsorbent for separation—recovery of CO composed of a carrier formed of silica and/or alumina on which cuprous or cupric compound or the latter's reduction products are carried as a process for separation—recovery of CO from any mixed gas containing CO by the PSA or TSA method. (Japanese Patent Application No. 82978/1985)

There is known a method which comprises using an adsorbent composed of zeolite with $SiO_2/Al_2O_3$ molar ratios of 20–200 on which cuprous ion is carried as a process for removing CO from any mixed gas containing CO. (Refer to U.S. Pat. No. 4,019,879.)

PROBLEMS THIS INVENTION IS TO SOLVE

Mentioned as the properties required of the adsorbent to be charged in the adsorption tower, when conducting the PSA or TSA method, are: (i) it shall make selective adsorption of the object component from among other coexisting components, (ii) the difference in the adsorption rate of the object component between the time when the tower is under pressure or at low temperature and the time when it is under reduced pressure or at high temperature shall be large, (iii) removal of the object component adsorbed shall be easy, (iv) it shall be difficult to adsorb and remove components other than the object one and (v) the life span of the adsorbent shall be long. These properties will become important factors in the PSA or TSA method for the great effect that they have on the purity and yield of the product gas.

The method which comprises utilizing as the adsorbent the mordenitic zeolite and which takes advantage of the physical adsorption—removal phenomenon of the adsorbent, involves the following problems: that because the adsorption capacity of CO is relatively small, the switching frequency of pressure swing must be increased, resulting in disadvantage not only in operation but also in the service lives of valves; that before making the adsorption operation, $CO_2$ must be removed previously; that due to the unavoidable coadsorption of $N_2$, the purity of the product is low; and that because the amount of the product CO gas used for cleaning the inner parts of the tower for removal of adsorbed $N_2$ is large, lowers yield of the product CO results.

On the other hand, the method which comprises using an adsorbent having a copper compound carried on active carbon, which takes advantage of the chemical adsorption—removal phenomenon of the adsorbent, involves the following problems: that when CO is to be separated from any mixed gas containing CO, $N_2$, $CO_2$, etc., $CO_2$, etc., tend to be coadsorbed, together with CO; it is, therefore, difficult to make separation—recovery of high purity CO; and that the adsorption capacity of CO on the adsorbent is not necessarily large. On these accounts, this method has not yet reached the stage where its employment in industrial scale is feasible.

The method which comprises using an adsorbent having cuprous halide and aluminum halide carried on a porous inorganic oxide takes advantage mainly of selective CO absorbency of $CuAlX_4$ (X is halogen); this method still needs to be improved in industrial applications in such respects as that because its adsorbing power of CO is too strong, it is difficult to remove that adsorbed CO at the step of degassing, that the operations to prepare the adsorbent need to be performed in a dried inert gas atmosphere, and that it is difficult to restore the activity of the adsorbent, once its activity has degraded.

In contrast, the process for which the present inventors previously filed a Japanese patent application, viz., the process which comprises using an adsorbent for separation—recovery of CO having a cuprous or cupric compound or the latter's reduction products carried on a carrier formed of silica and/or alumina has an advantage that CO with very high purity may be separated and recovered, but is disadvantageous in that with repetitive use of the adsorbent, its adsorption—discharge properties tend to gradually deteriorate, for which prolonging the life span of the adsorbent is required from industrial standpoint.

The method which comprises using an adsorbent having cuprous ion carried on zeolite with the $SiO_2$/$Al_2O_3$ molar ratios of 20-200 may be employed for the purpose of removing CO from a mixed gas with a relatively small CO content, it is hardly employable industrially for the purpose of making selective separation of CO from any mixed gas containing around 70% by volume or more of CO, because the adsorption capacity of CO is small and the purity and yield of the product CO gas are low.

In view of this situation, the present invention has been accomplished as a result of assiduous studies repetitively pursued in an effort to find an adsorbent which is capable of making separation—recovery of high purity CO at high efficiency from any mixed gas containing CO and which has a long life span.

SUMMARY OF THE INVENTION

The adsorbent for separation—recovery of CO of this invention comprises a composite carrier (X) composed of a carrier (a) formed of silica and/or alumina as its nucleus and an active carbonized organic material layer (b) formed on the surface thereof, on which a copper compound (Y) is carried. In case of this, as the carrier (a), use of a carrier formed of silica and/or alumina which gives a fine pore size distribution with maximum pore diameters occurring in a range of 60-120 Å is particularly desirable.

The method of preparing the adsorbent for separation—recovery of CO of this invention is characterized in that a solution or dispersion prepared by dissolving or dispersing a copper compound (Y) in a solvent is contacted with a composite carrier (X) composed of a carrier (a) formed of silica and/or alumina as its nucleus and an active carbonized organic material layer (b) formed on the surface thereof and thereafter, the solvent is removed.

When a cuprous compound is used as the copper compound (Y), the amount of the solution of said cuprous compound used should preferably be in a range of its saturation absorption factor ±10%, on basis of the composite carrier (X), and the contact between the composite carrier (X) and this solution made in the state of the composite carrier (X) being heated to 50°-150° C. previously. Further, if the contact between the composite carrier (X) and this solution is made in the state of not only the composite carrier (X) being heated to 50°-150° C. previously, but the solution also being heated to 40°-100° C., then, an adsorbent which is distinctly improved in the properties of CO adsorption—desorption is obtained.

Further, the process for separation—recovery of high purity CO of this invention is characterized by the use of an adsorbent for separation—recovery of CO comprising a composite carrier (X) composed of a carrier (a) formed of silica and/or alumina and an active carbonized organic material layer (b) formed on the surface thereof, on which a copper compound (Y) is carried, in making the separation—recovery of high purity CO from any mixed gas containing CO by the method of PSA and/or TSA.

DETAILED DESCRIPTION OF THE INVENTION

In the following, the present invention is described in detail:

ADSORBENT

The adsorbent for separation—recovery of CO of this invention comprises a composite carrier (X) composed of a carrier (a) formed of silica and/or alumina as its nucleus and an active carbonized organic material layer (b) formed on the surface thereof, on which a copper compound (Y) is carried.

As the carrier (a) formed of silica and/or alumina which gives a fine pore size distribution with maximum pore diameters occurring in a range of 60-120 Å should preferably be used. On a carrier which gives a fine pore size distribution with maximum pore diameters occurring below 60, the physical adsorption amount of other component gases like $CO_2$, etc., is large; as a result, the separation efficiency tends to be low. On the other hand, on a carrier which gives a fine pore size distribution with maximum pore diameters occurring on a range over 120 Å, the copper compound is not uniformly carried and the fine pore volume is small; for these reasons, its carrying capacity tends to be small and so its adsorbing—desorbing capacity is small. Consequently, a silica and/or alumina carrier which gives a fine pore size distribution with maximum pore diameters occurring outside the aforementioned range is inferior in properties to one with maximum pore diameters occurring in the aforementioned range, where the adsorption rate and discharge rate of CO are concerned.

The fine pore size distribution may be determined by adsorbing $N_2$ on the carrier, the temperature of liquid $N_2$ being $-196°$ C., and calculating the fine pore volume for each fine pore diameter from the adsorption isotherm or the removal isotherm.

Silica is obtained, for example, by neutralizing an aqueous solution of sodium silicate with such an acid as hydrochloric acid to deposit its precipitate, followed by washing with water and drying, and further, this precipitate is activated by heating under reduced pressure, as required, to be in the form of granules. Alumina is obtained, for example, by precipitating aluminum hydroxide from aqueous solution of soluble aluminum salts, filtrating the precipitate and then, strongly heating it. When jointly using silica and alumina, besides using mere mechanical mixture of silica and alumina, such methods may be employed as kneading silica gel and alumina gel in their wet state, dipping aluminum salts in silica gel, simultaneously gelling aqueous solution of silica and alumina, or depositing alumina gel on silica gel, etc.

These silica, alumina and silica—alumina are all available on the market. According to this invention, taking account of the pressure loss, etc., at the time of their charging into the tower, granules of diameters being on the order of 1–7 mm, for example, may be selected and put to use after drying, as required.

According to this invention, a composite carrier (X) composed of a carrier (a) formed of silica and/or alumina as the nucleus and an active carbonized organic material layer (b) formed on the surface thereof is employed.

The forming of the carbonized material layer (b) on the carrier (a) is done by making contact between the carrier (a) and the solvent solution or dispersion of an organic material which is carbonizable and soluble in solvent by dipping or spraying and, then, removing the solvent by dryng; thereafter, subjecting the deposited layer to a heat treatment at a temperature of 300°–800° C. for 30 min to 4 hr in an inert gas atmosphere of nitrogen, argon or helium, etc., or a heat treatment at 500°–800° C. for 30 min to 2 hr in an inert gas such as nitrogen, argon or helium, etc., containing steam or CO.

As the organic materials, various types which are carbonizable and soluble in solvents are usable; there are illustrated as these, water soluble organic materials (polyacryl amide, polyvinyl pyrrolidone, polyacrylic acid salts, polyvinyl methyl ether, polyethylene oxide, carboxy vinyl polymer, vinyl alcoholic polymers, starches, methyl cellulose, ethyl cellulose, hydroxy ethyl cellulose, hydroxy propyl cellulose, carboxy methyl cellulose, alginic acid salts, gelatin, casein, dextrin, dextran, xantene gum, guar gum, carrageenan, mannan, tragacanth gum, gum arabi, water soluble acrylic copolymer, water soluble polyester, initial reaction products of phenolic resin, materials contained in waste liquors or intermediary products in wood, pulp and paper making factories, materials contained in waste liquors, intermediary or final products in sugar and starch making factories and materials contained in waste liquors in adhesive and fiber producing factories), organic solvent soluble organic materials (polyamide, polystyrene, polyvinyl chloride, polyvinylidene chloride, polyester, polyurethane, polyacrylonitrile, polyolefin, acrylic resins, acetyl cellulose), petroleum or coal derivatives (e.g., compounds having relatively large molecular weights of polycyclic aromatic compounds and heterocyclic compounds), of which especially water soluble organic materials are preferable and among them, appropriate ones are selected with availability and economic factors additionally taken account of. Polymers illustrated above may include those of low polymerization degrees or oligomers.

As for the proportion by weight of the carbonized material layer (b) formed on the surface of the carrier (a), it is preferable to set the former at 0.1–10 parts by weight, particularly 0.5–4.5 parts by weight, to 100 parts by weight of the latter, but it is not limited to this range. If the proportion of the former is too small, the effect of prolonging the life span of the adsorbent falls short; on the other hand, if it it too large, the selective CO adsorbing power tends to decline.

As the copper compound (Y) to be carried on the composite carrier (X) obtained in this way, any cuprous or cupric compounds or reduction products from the cupric compounds may be used.

Hereinbelow illustrated as cuprous compounds are such cuprous halides as cuprous chloride, fluoride, bromide, etc.; cuprous oxide; cuprous cyanide; cuprous salts of oxygen acids and organic acids such as cuprous formate, acetate, oxalate, sulfate, sulfite, etc.; cuprous sulfide; and complex salts such as salts of dichloro, tetrachloro, dicyano, and tetracyano cuprous acids, etc. Cuprous chloride is especially preferable.

Illustrated as cupric compounds are cupric halides such as cupric chloride, fluoride, bromide, etc,; cupric oxide; cupric cyanide; salt of oxygen acids or organic acids such as cupric formate, acetate, oxalate, sulfate, nitrate, phosphate, carbonate, etc.; cupric hydroxide; cupric sulfide; and complex salts such as salts of trifluoro, tetrafluoro, trichloro, tetrachloro, tetracyano, tetrahydroxo and hexahydroxo cupric acids and ammine complex salts, etc.

When cupric compounds are carried on the carriers, their reduced form may be utilized. These reduction products are presumed to be mixtures of cuprous and cupric compounds or compounds having a valency being intermediary between monovalent and divalent.

The amount of the copper compound (Y) carried by the composite carrier (X) in proportion thereto is not particularly limited, but normally it should be selected from the range of 0.5–10 m-mol/g, preferably 1–6 m-mol/g. If this carrying amount is too small, its CO adsorbing capacity will fall short, but if too large, the separation efficiency contrarily will decline.

Preparation of adsorbents

The above-mentioned adsorbent may be prepared by contacting with the composite carrier (X) a solution or dispersion having copper compound (Y) dissolved or dispersed therein and therafter, removing the solvent.

The contacting solution or dispersion may be done by dipping, spraying, etc. In doing this, the solution or the dispersion of the copper compound (Y) is not merely contacted with the composite carrier (X) by such means as dipping or spraying, but the solution or dispersion of the copper compound (Y) may be contacted with the composite carrier (X) which has been degassed under vacuum, or after the solution or dispersion of the copper compound (Y) has been contacted with the composite carrier (X), the composite carrier (X) may be degassed under a condition of reduced pressure.

Mentioned as solvents are: e.g., water, hydrochloric acid, acetic acid, formic acid, aqueous solution of ammoniacal formic acid, ammonia water, halogen containing solvents (chloroform, carbon tetrachloride, ethylene dichloride, trichloroethane, tetrachloroethane, tetrachloroethylene, methylene chloride, fluoro solvents, etc.), sulfur containing solvents (carbon disulfide, dimethyl sulfoxide, etc.), nitrogen containing solvents (propionitrile, acetonitrile, diethylamine, dimethylformamide, N-methylpyrrolidone, etc.), hydrocarbons (hexane, benzene, toluene, xylene, ethylbenzene, cyclohexane, decalin, etc.), alcohols (methanol, ethanol, propanol, butanol, pentanol, cyclohexanol, ethylene glycol, propylene glycol, etc.), ketones (acetone, methyl ethyl ketone, methyl isobutyl ketone, acetophenone, isophorone, cyclohexanone, etc.), esters (methyl acetate, ethyl acetate, amyl acetate, methyl propionate, amyl propionate, etc.), ethers (isopropyl ether, dioxane, etc.), cellosolves (cellosolve, ethyl cellosolve, butyl cellosolve, cellosolve acetate, etc.), carbitols, etc.

After contacting the solution or dispersion of the copper compound (Y) with the composite carrier (X), the solvent is removed by some appropriate means in an atmosphere of air or in an atmosphere of such an inert gas as nitrogen, argon, etc. The removal of solvent may be made also by drying under reduced pressure, besides the mere drying by heating.

When cuprous compounds are used, adsorbents which give adequate CO adsorbing power may be obtained by this drying, but if they, after dried, are further subjected to heating treatment in an atmosphere of such an inert gas as $N_2$, argon, helium, etc., or in an atmosphere of such a reducing gas as CO, $H_2$, etc., adsorbents which give still more excellent CO adsorbing power will be obtained. The temperature for heating treatment should be appropriately selected from a range of 100°–300° C., preferably, 150°–250° C., whichever gas, inert gas or reducing gas, may be used.

In contrast, when cupric compounds are used, only insufficient CO adsorbing power is often obtained by the drying only. Therefore, when cupric compounds are used, the adsorbent, after being dried, should desirably be activated by conducting a heating treatment in an atmosphere of heating temperature should be 200°–600° C., preferably 400°–550° C. in such an inert gas as $N_2$ or argon, etc., and this range should be set about 100°–230° C. in such a reducing gas as CO or $H_2$, etc.

By this heating treatment, the cupric compound carried by the carrier is partly reduced into a mixture of cuprous compound and cupric compound or a compound having an intermediary valence between monovalent and divalent.

In the following, preferable conditions, when cuprous compound is used as the copper compound, are further described:

When cuprous compound is used, among other solvents above-mentioned, water, hydrochloric acid, acetic acid, formic acid, aqueous solution of ammoniacal formic acid, ammonia water, halogen containing solvent, hydrocarbons, alcohols, ketones, esters, ethers, cellosolves, carbitols, etc., are normally used; industrially, hydrochloric acid is especially preferred.

When employing a cuprous compound, the contacting of the solution of said cuprous compound with the composite carrier (X) should desirably be conducted in such a way that the following two conditions be met.

First of all, the solution of the cuprous compound used should be in the amount falling in the range of saturation absorption factor ±10%, on a basis of the composite carrier (X), in other words, the solution used should be nearly not more nor less than the saturation amount absorbed by the composite carrier (X). Here the saturation absorption factor will change depending on temperature; so the saturation absorption factor shall refer to that at the temperature at the time of actual operation of absorption. If the amount of the solution used falls short, the amount of cuprous compound carried diminishes that much, resulting in reduced amount of CO adsorption. On the other hand, even if a larger amount of the solution than the aforementioned range is used, the rate of the cuprous compound carried by the composite carrier (X) in proportion thereto will not be increased (because the composite carrier (X) has smaller cuprous compound adsorbing power than other porous carriers like active carbon); rather the consumption of the solvent more than is necessary will lead to industrial disadvantage. If the amount of solvent is too large, the cuprous compound impregnated in the composite carrier (X) will redissolve in the solvent in the step of removing solvent, resulting in, contrarily, lessened CO adsorbing power of the adsorbent. Accordingly, the saturation absorption factor of the solution on a basis of the composite carrier (X) should be measured previously and the amount of the solution equivalent to the saturation absorption factor should be brought into contact with the composite carrier (X).

Second, the composite carrier (X) should be in contact with the solution in the state of being heated previously to 50°–150° C., preferably 80°–120° C. If the composite carrier (X) is heated previously in this manner, the amount of the cuprous compound carried by the composite carrier (X) in proportion thereto is increased, thus yielding an adsorbent having large CO adsorbing power.

If the amount of the cuprous compound carried by the composite carrier (X) in proportion thereto is desired to be further increased, by preliminarily heating not only the composite carrier (X) but also the solution, the latter to 40°–100° C., preferably 50°–90° C., an adsorbent much better in CO adsorption-desorption property may be obtained.

After making contact between the composite carrier (X) and the solution, the solvent should desirably be removed by drying, without lowering the temperature of system. After the drying, the product is subjected to a heat treatment in an atmosphere of inert gas or a reducing gas, as required.

Separation and recovery of CO

With the adsorbent obtained as hereabove described filled in an adsorption tower, separation-recovery of CO from any mixed gas containing CO is carried out by PSA or TSA method.

When performing separation-recovery of CO by the PSA method, the adsorption pressure in the adsorbing step should desirably be higher than the atmospheric pressure, for example, 0–6 kg/cm$^2$G and the vacuum degree in vacuum degassing step should desirably be lower than the atmospheric pressure, for example, 200–10 Torrs.

When performing the separation-recovery of CO by the TSA method, the adsorbing temperature in the adsorbing step should desirably be set, for example, on the order of about 0°–40° C., and the degassing temperature in the degassing step, for example, on the order of about 60°–180° C.

It is also feasible to make joint use of the PSA and the TSA methods, making the adsorption at a low temperature under a pressure higher than the atmospheric pressure and the degassing at a high temperature under a pressure lower than the atmospheric pressure.

Since the TSA method is disadvantageous in energy consumption in comparison with the PSA method, the PSA method of the PSA-TSA joint-use method should desirably be employed in industrial applications.

As the mixed gas containing CO which is adaptable for the method of this invention, for example, the converter gas generated by converters in ironworks is used. The converter gas contains normally, $O_2$, methane and other hydrocarbons, water and small amounts of $H_2S$, $NH_3$, etc., besides CO as its main component. Blast furnace gas, electric furnace gas, producer gas, etc., besides the converter gas, may be used as the material gas.

According to this invention, a step for adsorption-removal of components which might poison the aforementioned adsorbent or retrench its life span, i.e., such impurities as sulfur compounds, $NH_3$, etc., water removing step and $O_2$ removing step should desirably be provided prior to the CO separation-recovery step. However, $CO_2$ removing step or $N_2$ removing step will not be necessary.

When the PSA method is employed in industrial applications, it is proper to successively repeat the following operations in respective adsorption towers, using a plurality of such adsorption towers charged with the adsorbent:

(1) A step of adsorbing CO by letting the material gas flow through the adsorption tower and a step of using the discharged gas for pressure raising (III) in another tower shortly before the CO concentration in the discharged gas has become equal to that in the material gas;

(2) A pressure reducing step in which after accomplishing the adsorption step, this adsorption tower and another adsorption tower in which the vacuum degassing has been accomplished are connected, to reduce the pressure in the former adsorption tower to around the atmospheric pressure in parallel flow and a step of pressure raising (I) in the latter adsorption tower in correspondence with the pressure reduction;

(3) A cleaning step of cleaning the pressure reduced adsorption tower of the impurity gas remaining therein by introducing thereinto part of the product gas in parallel flow and a step of using the gas discharged from the cleaning step for the pressure raising (II) in another tower;

(4) A step of recovering the product gas by degassing in counterflow the CO out of the adsorbent under reduced pressure by applying vacuum;

(5) A step of pressure-raising (I) in which the adsorption tower in which the recovery of the product has been accomplished and the adsorption tower in which the adsorbing step has been accomplished are connected, to raise the pressure in the former adsorption tower in a parallel flow manner;

(6) A step of pressure-raising (II) in which the pressure-raising is made in a parallel flow manner by use of waste cleaning gas of the other adsorption tower;

(7) A step of pressure-raising (III) in which the pressure-raising is made by use of the waste gas a moment before the adsorption step has been accomplished in the other adsorption tower;

By successively repeating the above-mentioned operations in respective adsorption towers, high purity CO gas may be continuously separated and recovered at a high yield.

ACTIVITIES

The adsorption-desorption phenomena by use of the solid adsorbent of this invention are believed to be mainly based on reversible chemical reactions (complex-forming reaction and dissociation reaction) between the copper compound (Y) carried by the composite carrier (X) and CO (chemical reactions with $N_2$ and $CO_2$ do not take place), and secondarily on its physical adsorption on the fine pore surfaces of the composite carrier (X) and removal therefrom.

The composite carrier (X) is composed of a carrier (a) formed of silica and/or alumina as its nucleus and an active carbonized organic material layer (b) formed on the surface thereof; accordingly, while maintaining its excellent selective CO adsorbing property due to the use of silica and/or alumina as the carrier, the hydrophilic property of said carrier is improved by the carbonized material layer (b); as a result, activity decline becomes less likely; moreover, oxidation of the copper compound (Y) is effectively prevented by the existence of the carbonized layer (b); these activities are believed to contribute to extending the life span of the adsorbent.

In preparing the adsorbent, use is made of cuprous compound such as the copper compound (Y); the amount of the solution of said cuprous compound used is nearly corresponding to the saturation absorption factor on a basis of the composite carrier (X) and contacting between the composite carrier (X) and said solution is made with the composite carrier (X) or both the composite carrier (X) and the solution brought in the state of having been heated previously, the amount of the solution adsorbed by the composite carrier (X) in proportion thereto becomes larger and as a result, the cuprous compound is carried by the fine pores interior of the composite carrier (X) affording quite efficient adsorption-desorption of CO.

Effect of the Invention

According to this invention, following excellent effects are obtained:

(i) The composite carrier and the adsorbent may be readily prepared, using cheap materials;

(ii) The adsorbent is not only stable to heat, but being hard, it is durable, when charged in an adsorption tower;

(iii) A composite carrier formed as its nucleus of a silica and/or alumina carrier having a fine pore size distribution which gives maximum pore diameters in a specific range is used to carry the copper compound thereon; accordingly, it becomes possible to distinctively increase the capacity of adsorption-desorption of CO, while reducing the amount of adsorption-desorption of other component gases, enabling separation-recovery of CO at very high purity;

(iv) Degradation of activity of the adsorbent is slight, even when left standing in atmosphere and moreover, the lost activity will be readily restored by heat treatment in inert gas, assuring its extended life span;

The carrier formed of silica and/or alumina generally has the disadvantage of having smaller cuprous compound adsorbing power than active carbon and other porous carriers, but according to this invention, this disadvantage has been overcome; thus, the cuprous compound can be efficiently carried in the fine pores interior of the composite carrier, as a result, an adsorbent excelling in adsorbing-desorbing powers has become obtainable and the amount of the solvent in preparing the adsorbent has become reducible.

Thus this invention enables the separation-recovery of high purity CO on industrial scale from converter gas or other gases containing CO. Its significance in chemical industry is enormous.

EXAMPLES

Figure 1:
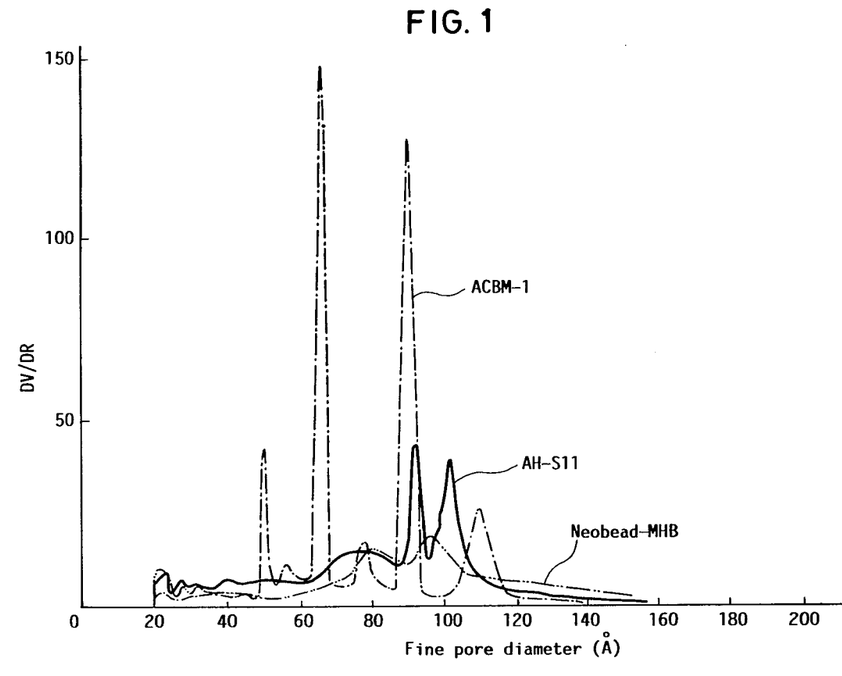
FIG. 1 shows fine pore diameter distribution curves of the carriers used in the examples.
Figure 2:
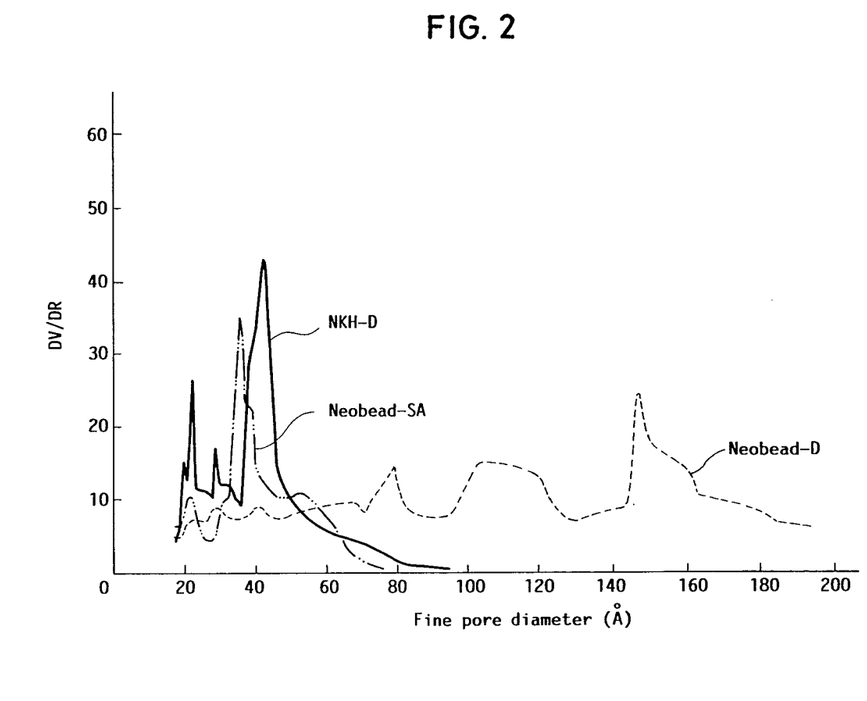
FIG. 2 shows fine pore diameter distribution curves of the carriers used in the comparative examples.

In the following, the present invention is described further in detail in connection with embodiments thereof:

FIG. 1 shows fine pore diameter distribution curves of the carriers used in the examples; and FIG. 2 shows fine pore diameter distribution curves of the carriers used in the comparative examples.

In these graphs, DV/DR taken on the ordinate designates the differential quotient of V/R (fine pore volume/fine pore diameter, i.e., an index indicating how many fine pore volumes are there which have the fine pore radii up to the specified value), that is, an index indicating the rate of increase or decrease of the number of fine pore volumes per unit fine pore radius.

EXAMPLE 1

Preparation of composite carrier (X)

Thirty cubic-centimeter of active alumina (AH-S11 manufactured by Fujimi Kenmazai Kogyo K.K.) having a fine pore diameter distribution shown in FIG. 1 and a mean grain size of 2 mm was added into 30 cc of a sulfite pulp waste liquor with solid content 47.5% by weight which was diluted tenfold with water; then, after subjecting the active alumina to the immersion treatment at the normal temperature for 30 min, it is filtered and dried at 110° C. for 4 hr. After the drying, it was carbonized by raising the temperature at a rate of 5° C./min in an $N_2$ gas atmosphere, using a heating furnace, followed by a heat treatment at 550° C. for 1 hr.

In that way, a composite carrier (X) with the alumina carrier (a) as its nucleus and a carbonized organic material layer (b) formed on the surface thereof was obtained. The proportion by weight of the carbonized layer (b) to 100 parts by weight of the carrier (a) was 2.3 parts by weight.

Preparation of adsorbent

Six grams of cuprous chloride as the copper compound (Y) was dissolved in 16 cc of hydrochloric acid heated to approx. 60° C. Into this solution, 30 cc of the aforementioned composite carrier (X) heated to 100° C. was added and after distilling off the solvent in $N_2$ gas current, while subsequently heating it to 200° C. by mantle heater, it was cooled to the room temperature, yielding an adsorbent for separation-recovery of CO. The amount of the copper compound (Y) carried by the composite carrier (X) in proportion thereto was 3.0 m-mol/g.

The mixing proportion of the solution to the composite carrier (X) above-mentioned was equal to the saturation absorption factor of the solution on a basis of the composite carrier (X).

Separation-recovery of CO

The adsorbent obtained as above-mentioned was charged in an adsorption tower (15 mm$\phi$ × 300 mmH) and a mixed gas of the following composition under 1 atm. was fed into this adsorption tower, to adsorb CO thereby at 20° C.

CO: 71.0% by vol.
$N_2$: 12.8% by vol.
$CO_2$: 16.2% by vol.

At this time, the amount of CO adsorbed was 18.0 cc/cc.

After the adsorption operation, the inner part of the tower was cleaned with 90 ml of CO and subsequently, by making degassing at a pressure of 50 Torrs for 5 min, using a vacuum pump, thereby discharging the gas adsorbed therein. At this time, the amount of CO discharged was 13.0 cc/cc and the composition of the gas recovered was:

CO: 99.9% by vol.
$CO_2$: 0.1% by vol.
$N_2$: Trace.

The same adsorption test was conducted after leaving this adsorbent in atmosphere for 48 hr. The amount of CO discharged at this time was 11.0 cc/cc.

The same adsorption test was conducted after treating this adsorbent in $N_2$ at 200° C. The amount of CO discharged at this time was 13.0 cc/cc.

EXAMPLE 2

A composite carrier (X) was prepared in the same manner as in Example 1, except that a sulfite pulp waste liquor diluted to twentyfold with water was used. The proportion by weight of the carbonized material layer (b) to 100 parts by weight of the carrier (a) was 1.1 part by weight.

Then using this composite carrier (X), the preparation of the adsorbent and further, the adsorption test were conducted similarly as in Example 1. The amount of CO adsorbed and the amount of CO discharged were exactly the same as in Example 1.

EXAMPLE 3

The composite carrier (X) was prepared in the same manner as in Example 1, except that a solution prepared by dissolving 1.5 g of fine granulated sugar in water being 30 cc was used in place of 30 cc of diluted solution of sulfite pulp waste liquor. The proportion by weight of the carbonized material layer (b) to 100 parts by weight of the carrier (a) was 1.0 part by weight.

Subsequently, using this composite carrier (X), the preparation of the adsorbent and further, the adsorption test were conducted similarly as in Example 1.

The amount of CO adsorbed at this time was 17.5 cc/cc, and the amount of CO discharged 12.9 cc/cc.

The same adsorption test was conducted after leaving this adsorbent in atmosphere for 48 hr. The amount of CO discharged this time was 11.0 cc/cc.

The same adsorption test was conducted after treating this adsorbent in $N_2$ at 200° C. The amount of CO discharged at this time was 12.8 cc/cc.

EXAMPLE 4

The adsorption operation of the mixed gas in Example 1 was conducted under a pressure of 2 kg/cm$^2$G; after the adsorption operation, the inner part of the tower was cleaned with 90 ml of CO with the pressure reduced to the atmospheric pressure; subsequently, degassing was done at a pressure of 50 Torrs for 5 min, using a vacuum pump, thereby discharging the gas adsorbed therein. The results were as follows:

Amount of CO adsorbed: 24.0 cc/cc
Amount of CO discharged: 13.1 cc/cc
Composition of recovered gas
  CO: 99.9% by vol.
  $CO_2$: 0.1% by vol.
  $N_2$: Trace.
Amount of CO discharged when the adsorption test was conducted after leaving the adsorbent in atmosphere for 48 hr: 11.1 cc/cc
Amount of CO discharged when the adsorption test was conducted after treating the adsorbent in $N_2$ at 200° C.: 13.2 cc/cc.

EXAMPLES 5-6

Preparation of composite carrier (X) and adsorbent

The composite carrier (X) and the adsorbent were prepared in the same manner as in Example 1, except that in place of the active alumina used in Example 1, active alumina (ACBM-1 manufactured by Shokubai Kasei Kogyo K.K. : Example 5) having the fine pore diameter distribution shown in FIG. 1 and a silica-alumina carrier (Neobead-MHB, manufactured by Mizusawa Kagaku Kogyo K.K. : Example 6) were used.

Provided that the proportion by weight of the carbonized material layer (b) to 100 parts by weight weight of the carrier (a) was 2.3 parts by weight in both Examples 5 and 6.

The mixing rate of the solution to the composite carrier (X) in the above description was equal to the saturation absorption factor of the solution on a basis of the composite carrier (X).

Separation-recovery of CO

The adsorbent obtained as above-described was charged in an adsorption tower (15 mm $\phi \times 300$ mmH) and into this tower, a mixed gas at 1 atm. of the undermentioned composition was fed to adsorb CO thereon at 25° C. and the amount of each component gas adsorbed was measured:
  CO: 71.4% by vol.
  $N_2$: 12.7% by vol.
  $CO_2$: 15.9% vol.

After this adsorption operation, degassing was done under a pressure of 25 Torrs for 5 min, using a vacuum pump, thereby discharging the gas adsorbed. Again the amount of each component gas was measured.

Even when this operation was repeated, no variation was observed in the amount of adsorption-desorption of each component gas. The results are shown in Table 1.

TABLE 1

|  | Example 5 | Example 6 |
|---|---|---|
| Amount of initial adsorption |  |  |
| CO | 18.9 | 16.5 |
| $CO_2$ | 1.0 | 1.0 |
| $N_2$ | trace | trace |
| Amount of adsorption beyond second cycle |  |  |
| CO | 10.5 | 9.3 |
| $CO_2$ | 0.6 | 0.6 |
| $N_2$ | trace | trace |

Unit is cc/cc.

EXAMPLE 7

A composite carrier (X) and an adsorbent were prepared in the same manner as in Example 1,. except that 30 cc of silica-alumina (N631L, manufactured by Nikki Kagaku K.K.) with grain size 3 mm was used, and with this adsorbent, the operation of separation-recovery of CO was conducted similarly as in Examples 5-6.

Provided that the proportion by weight of the carbonized material layer (b) to 100 parts by weight of the carrier (a) was 2.0 parts by weight, the amount of hydrochloric acid used 13 cc, and cuprous chloride 5 g. The amount of the cuprous chloride carried by the composite carrier (X) in proportion thereto was 2.5 m-mol/g.

The mixing proportion of the solution to the composite carrier (X) in the above described example is equal to the saturation absorption factor of the solution on a basis of the composite carrier (X).

The results were as follows:
  Amount of initial adsorption of CO: 6.3 cc/cc
  Amount of adsorption of CO beyond the second cycle: 41.1 cc/cc.

EXAMPLE 8

Cupric chloride solution was prepared by dissolving 10 g of cupric chloride in 30 ml of water in a 200 ml Erlenmeyer flask. Into this solution, 30 cc of the composite carrier (X) used in example 1 was added and after degassing for 1 min by an aspirator, the mixture was left standing for 4 hr. Then after distilling the solvent off in an $N_2$ current, while heating the product at 200° C. by a mantle heater, it was subsequently, subjected to a heat treatment in an $N_2$ current at 500° C. for approx. 1 hr. Thereafter, it was cooled down to the room temperature, yielding an adsorbent for separation-recovery of CO. The amount of the cupric chloride carried by the composite carrier (X) in proportion thereto was 3.7 m-mol/g.

An adsorption test was conducted under the same conditions as in Example 1, using this adsorbent. The results were as follows:
  Amount of CO adsorbed: 6.1 cc/cc
  Amount of cleaning CO used: 90 ml
  Amount of CO discharged: 4.3 cc/cc
  Composition of recovered gas
    CO: 99.4% by vol.
    $CO_2$: 0.6% by vol.
    $N_2$: Trace.
  Amount of CO discharged when the adsorption test was conducted after leaving the adsorbent in atmosphere for 48 hr: 3.2 cc/cc
  Amount of CO discharged when the adsorption test was conducted after treating the adsorbent in $N_2$ at 200° C.: 4.2 cc/cc.

EXAMPLE 9

Six point seven grams of cupric chloride was dissolved in 16 cc of ethanol in a 200 ml Erlenmeyer flask; into this solution, 30 cc of the composite carrier (X) used in Example 6 was added and stirred for 1 hr; thereafter, the solvent was distilled off in an $N_2$ current, while heating this mixture to 100° C. by a mantle heater. Then the product was further heated to 400° C. in an $N_2$ current, using an electric furnace, and after subjecting it to a heating treatment for 1 hr at this temperature, was cooled down to the room temperature, yielding an adsorbent for separation-recovery of CO. The amount of cupric chloride carried by the composite carrier (X) in proportion thereto was 3.0 m-mol/g.

By making the similar operation as in Example 6, using the adsorbent obtained as above-described, the amount of adsorption-desorption of each component gas was measured. The results were as follows:

Amounts of initial adsorption
CO: 17.4 cc/cc
$CO_2$: 1.1 cc/cc
$N_2$: Trace

Amounts of adsorption beyond the second cycle
CO: 9.3 cc/cc
$CO_2$ 0.6 cc/cc
$N_2$: Trace.

EXAMPLE 10

The adsorbing operation was conducted at 20° C. under 1 atm., and the discharging operation at 120° C. at 1 atm., in the same manner as in Example 1. The results obtained were as follows:

Amount of CO adsorbed: 18.0 cc/cc
Amount of CO discharged: 15.5 cc/cc
Composition of recovered gas
CO: 99.2% by vol.
$CO_2$: 0.8% by vol.
$N_2$: Trace
Amount of CO discharged when the adsorption test was conducted after leaving the adsorbent in an atmosphere for 48 hr: 13.8 cc/cc
Amount of CO discharged when the adsorption test was conducted after treating the adsorbent in $N_2$ at 200° C.: 15.5 cc/cc.

EXAMPLE 11

A composite carrier (X) was prepared similarly as in Example 1, except that 30 cc of silica (DC80 manufactured by RHONE POULENC S.A.) with mean grain size 3 mm was used in place of active alumina.

This composite carrier (X) was added into a cupric chloride solution in the similar manner as in Example 8 and after degassing the mixture for 1 min by means of an aspirator, it was left standing for 4 hr. Then the solvent was distilled off in an $N_2$ current, while heating it to 200° C. with a mantle heater and subsequently, it was subjected to a heat treatment for approx. 1 hr in a CO current at 450° C. Thereafter, it was cooled down to the room temperature, yielding an adsorbent for separation-recovery of CO.

An adsorption test was conducted under the same conditions as in Example 1, using this adsorbent. The results were as follows:

Amount of CO adsorbed: 5.8 cc/cc
Amount of CO discharged: 3.6 cc/cc
Composition of recovered gas
CO: 98.7% by vol.
$CO_2$: 1.3% by vol.
$N_2$: Trace
Amount of CO discharged when the adsorption test was conducted after leaving the adsorbent in atmosphere for 48 hr: 2.8 cc/cc
Amount of CO discharged when the adsorption test was conducted after treating the adsorbent in $N_2$ at 200° C.: 3.4 cc/cc.

EXAMPLE 12

Preparation of a composite carrier (X), preparation of adsorbent and further, an adsorption test were conducted in the similar manner as in Example 1, except that waste liquor containing starch and its decomposition products, waste liquor from cleaning water-soluble polyester and residue of acrylic paint diluted with alcohol were used respectively in place of sulfite pulp waste liquor. The proportion by weight of the carbonized material layer (b) to 100 parts by weight of alumina carrier (a) was set to 1.2–3.0 parts by weight.

The amount of CO adsorbed was 18.0–17.2 cc/cc, and the amount of CO discharged 13.0–12.6 cc/cc.

COMPARATIVE EXAMPLE 1

The test was conducted similarly as in Example 1, except that an adsorption tower charged with mordenitic zeolite (grain size 3 mm) as the adsorbent was used. However, the amount of cleaning CO of 90 ml was insufficient; therefore, it was increased to 180 ml. The results were as follows:

Amount of CO adsorbed: 7.5 cc/cc
Amount of CO discharged: 4.9 cc/cc
Composition of recovered gas
CO: 83.0% by vol.
$CO_2$: 16.7% by vol.
$N_2$: 1.3% by vol.
Amount of CO discharged when the adsorption test was conducted after leaving the adsorbent in an atmosphere for 48 hr: 3.8 cc/cc
Amount of CO discharged when the adsorption test was conducted after treating the adsorbent in $N_2$ at 200° C.: 4.8 cc/cc.

Thus in Comparative Example 1, even if the amount of cleaning CO is increased, appreciably large amounts of $CO_2$ and $N_2$ mix into the recovered gas; as a consequence, high purity product CO can not be obtained.

COMPARATIVE EXAMPLE 2

An adsorbent was prepared similarly as in Example 1, except that active carbon (grain size 3 mm) available on the market was used in place of the composite carrier (X). Using this adsorbent, the test was conducted in the same manner as in Example 1. However, the amount of the cleaning CO which was insufficient at 90 ml; therefore, it increased to 180 ml. The results were as follows:

Amount of CO adsorbed: 19.1 cc/cc
Amount of CO discharged: 6.9 cc/cc
Composition of recovered gas
CO: 97.0% by vol.
$CO_2$: 2.2% by vol.
$N_2$: 0.8% by vol.
Amount of CO discharged when the adsorption test was conducted after leaving the adsorbent in atmosphere for 48 hr: 6.1 cc/cc
Amount of CO discharged when the adsorption test was conducted after treating the adsorbent in $N_2$ at 200° C.: 6.9 cc/cc.

Thus in Comparative Example 2, even if the amount of the cleaning CO is increased, substantial amounts of CO and $N_2$ mix into the recovered gas; as a consequence, high purity product CO can not be obtained.

COMPARATIVE EXAMPLES 3–4

Composite carriers (X) and adsorbents were prepared in the same manner as in Example 1, except that active alumina (NKH-D, manufactured by Sumitomo Kagaku Kogyo K.K.: Comparative Example 3) and silica-alumina carrier (Neobead-D, manufactured by Mizusawa Kagaku Kogyo K.K.: Comparative Example 4) which gives a fine pore diameter distribution shown in FIG. 2 were used respectively, and with them, the operations of separation-recovery of CO were conducted similarly as in Example 5. The results are shown in Table 2.

TABLE 2

|  | Comparative Example 3 | Comparative Example 4 |
|---|---|---|
| Amount of initial adsorption |  |  |
| CO | 22.0 | 9.4 |
| $CO_2$ | 2.0 | 1.6 |
| $N_2$ | trace | trace |
| Amount of adsorption beyond second cycle |  |  |
| CO | 10.9 | 5.6 |
| $CO_2$ | 1.3 | 1.2 |
| $N_2$ | trace | trace |

The unit is cc/cc.

COMPARATIVE EXAMPLES 5-6

Composite carriers (X) and adsorbents were prepared in the same manner as in Example 1, except that use was made of silica-alumina carriers Neobead-D (Comparative Example 5) and Neobead-SA (Comparative Example 6) manufactured by Mizusawa Kagaku Kogyo K.K. which give a fine pore diameter distributions shown in FIG. 2, and with them, the operations of separation-recovery of CO were conducted similarly as in Example 9. The results are shown in Table 3.

TABLE 3

|  | Comparative Example 5 | Comparative Example 6 |
|---|---|---|
| Amount of initial adsorption |  |  |
| CO | 14.0 | 9.0 |
| $CO_2$ | 1.6 | 1.4 |
| $N_2$ | trace | trace |
| Amount of adsorption beyond the second cycle |  |  |
| CO | 8.1 | 2.4 |
| $CO_2$ | 1.2 | 1.2 |
| $N_2$ | trace | trace |

The unit is cc/cc.

Thus Comparative Examples 3-6 show that the amount of adsorption-desorption of CO are small and moreover, the amount of adsorption-desorption of other component gases are large; therefore, high purity product CO can not be obtained.

EXAMPLE 13

Operations were conducted in the same manner as in Example 1, except that 30 cc of the composite carrier (X) used in Example 1 was added at the room temperature to a cuprous chloride solution at the room temperature having 9.9 g of cuprous chloride dissolved in 30 cc of hydrochloric acid.

The results were as follows, which were inferior to those of Example 1:
Amount of CO adsorbed: 13.9 cc/cc
Amount of CO discharged: 6.0 cc/cc.

EXAMPLE 14

Operations were conducted in the same manner as in Example 7, except that 30 cc of the composite carrier (X) used in Example 7 was added at the room temperature into a cuprous chloride solution having 9.9 g cuprous chloride dissolved in 30 cc of hydrochloric acid, which was held at the room temperature.

The results were as follows, which were inferior to those of Example 7:
Amount of CO adsorbed: 5.6 cc/cc
Amount of CO discharged: 3.8 cc/cc.

REFERENCE EXAMPLE

An adsorbent was prepared similarly as in Example 1, except that 30 cc of active alumina (AH-S11, manufactured by Fujimi Kenmazai Kogyo K.K.) with mean grain size 2 mm which was heated to 100° C. was used in place of the composite carrier (X) and using this adsorbent, similar experiment as in Example 1 was conducted. The results were as follows:
Amount of CO adsorbed: 18.3 cc/cc
Amount of CO discharged: 13.1 cc/cc
Composition of recovered gas
CO: 99.9% by vol.
$CO_2$: 0.1% by vol.
$N_2$: Trace
Amount of CO discharged when the adsorption test was conducted after leaving the adsorbent in atmosphere for 48 hr: 7.3 cc/cc
Amount of CO discharged when the adsorption test was conducted after treating the adsorbent in $N_2$ at 200° C.: 7.4 cc/cc.

The Reference Example shows that at the first cycle adsorption test, nearly equal amounts of adsorption-discharge of CO to those of Example 1 are obtained, but that with regard to its property after leaving in atmosphere for 48 hr, degradation is notable in comparison with that of Example 1 and that this property reduction can not be restored even by treatment in $N_2$ at 200° C.

What is claimed is:

1. An adsorbent for separation-recovery of CO comprising a composite carrier (X) composed of a carrier (a) formed of silica and/or alumina as its nucleus and an active carbonized material layer (b) formed on the surface thereof, on which a copper compound (Y) is carried.

2. The adsorbent according to claim 1 wherein said carrier (a) formed of silica and/or alumina has a fine pore size distribution with maximum pore diameters occurring in a range of 60-120 Å.

3. The adsorbent according to claim 1 wherein the proportion by weight of said carbonized material layer (b) formed on the surface said carrier (a) is 0.1-10 parts by weight to 100 parts by weight of the latter.

4. The adsorbent according to claim 1 wherein said copper compound (Y) is a cuprous or cupric compound or reduction products from the cupric compound.

5. The adsorbent according to claim 1 wherein the proportion of said copper compound (Y) carried on said composite carrier (X) to the latter is 0.5-10 m-mol/g.

6. A method of preparing an adsorbent for separation-recovery of CO comprising the steps of dissolving or dispersing a copper compound (Y) in a solvent, contacting the resulting solvent or dispersion with a composite carrier (X) composed of a carrier (a) formed of silica and/or alumina as its nucleus and an active carbonized material layer (b) formed on the surface thereof and thereafter, removing the solvent.

7. The method according to claim 6 wherein said carrier (a) formed of silica and/or alumina has a fine pore size distribution with maximum pore diameters occurring in a range of 60-120 Å.

8. The method of claim 6 wherein the proportion by weight of said carbonized material layer (b) formed on the surface of said carrier (a) is 0.1–10 parts by weight to 100 parts by weight of the latter.

9. The method of claim 6 wherein said copper compound (Y) is a cuprous compound, cupric compound or reduction products from the cupric compound.

10. The method of claim 6 wherein the proportion of said copper compound (Y) carried on said composite carrier (X) to the latter is 0.5–10 m-mol/g.

11. The method according to claim 6 characterized in that the solution or dispersion prepared by dissolving or dispersing the copper compound (Y) in a solvent is contacted with the composite carrier (X) composed of the carrier (a) formed of silica and/or alumina as its nucleus and the active carbonized material layer (b) formed on the surface thereof and thereafter, the solvent is removed and furthermore, the product is heat-treated in an inert gas or reducing gas atmosphere.

12. The method according to claim 6 characterized in that a cuprous compound is used as the copper compound (Y), that the solution prepared by dissolving said cuprous compound in a solvent is used in an amount falling in a range of the saturation absorption factor ±10% on a basis of the composite carrier (X) and that the contacting between the composite carrier (X) and this solution is made in the state of the composite carrier (X) having been heated to 50°–150° C. previously.

13. The method according to claim 12 characterized in that the contacting between the composite carrier (X) and the solution is made under a state of this solution having been heated to 40°–100° C., with the composite carrier (X) having been heated to 50°–150° C. previously.

14. The method according to claim 12 characterized in that after removing the solvent, the product is further heat-treated in an inert gas or a reducing gas atmosphere.

15. The method according to claim 12 wherein the solvent is hydrochloric acid.

16. A process for separation-recovery of high purity CO from any mixed gas containing CO by the method of pressure swing adsorption and/or temperature swing adsorption, which comprises using as the adsorbent a composite carrier (X) composed of a carrier (a) formed of silica and/or alumina as its nucleus and an active carbonized material layer (b) formed on the surface thereof, on which a copper compound (Y) is carried.

17. The process according to claim 16 wherein said carrier (a) formed of silica and/or alumina has a fine pore size distribution with maximum pore diameters occurring in a range of 60–120 Å.

18. The process according to claim 16 wherein the proportion by weight of said carbonized material layer (b) formed on the surface of said carrier (a) is 0.1–10 parts by weight to 100 parts by weight of the latter.

19. The process according to claim 16 wherein said copper compound (Y) is cuprous or cupric compound or reduction products from the cupric compound.

20. The process according to claim 16 wherein the proportion of said copper compound (Y) carried on said composite carrier (X) to the latter is 0.5–10 m-mol/g.

* * * * *